(12) United States Patent
Kim

(10) Patent No.: US 6,577,367 B2
(45) Date of Patent: Jun. 10, 2003

(54) ARRAY SUBSTRATE FOR A LIQUID CRYSTAL DISPLAY DEVICE AND METHOD FOR FABRICATING THE SAME

(75) Inventor: Soo-Mahn Kim, Kyonggi-do (KR)

(73) Assignee: LG. Philips LCD Co., Ltd, Seoul (KR)

( * ) Notice: Subject to any disclaimer, the term of this patent is extended or adjusted under 35 U.S.C. 154(b) by 338 days.

(21) Appl. No.: 09/757,601

(22) Filed: Jan. 11, 2001

(65) Prior Publication Data

US 2001/0022647 A1 Sep. 20, 2001

(Under 37 CFR 1.47)

(30) Foreign Application Priority Data

Jan. 12, 2000 (KR) .......................... 2000-01339

(51) Int. Cl.[7] ............................. G02F 1/1343
(52) U.S. Cl. ................ 349/139; 349/143; 349/192; 324/770
(58) Field of Search ................ 349/139, 143, 349/192, 141, 106; 324/770; 345/96, 103

(56) References Cited

U.S. PATENT DOCUMENTS

| | | | | | |
|---|---|---|---|---|---|
| 5,285,301 | A | * | 2/1994 | Shirahashi et al. | 349/143 |
| 5,719,648 | A | * | 2/1998 | Yoshii et al. | 349/42 |
| 5,946,068 | A | * | 8/1999 | Lee et al. | 349/143 |
| 6,163,357 | A | * | 12/2000 | Nakamura | 349/155 |
| 6,384,878 | B1 | * | 5/2002 | Kwak | 349/40 |
| 6,509,949 | B1 | * | 1/2003 | Lu et al. | 349/187 |

* cited by examiner

Primary Examiner—Robert H. Kim
Assistant Examiner—David Y. Chung
(74) Attorney, Agent, or Firm—McKenna Long & Aldridge

(57) ABSTRACT

A method of fabricating LCD devices from large array substrates having redundant pixels. Large array substrates without defects can be used to fabricate large LCD device and the redundant pixels can be disabled. Large array substrates with defects can be cut into smaller array substrates and then used to form small LCD devices. The pixels around the cutting lines of the large array substrate are redundant and can be covered or disabled.

21 Claims, 7 Drawing Sheets

ARRAY SUBSTRATE FOR A LIQUID CRYSTAL DISPLAY DEVICE AND METHOD FOR FABRICATING THE SAME

This application claims the benefit of Korean Patent Application No. 2000-1339, filed on Jan. 12, 2000, under 35 U.S.C. §119, the entirety of which is hereby incorporated by reference.

BACKGROUND OF THE INVENTION

1. Field of the Invention

The present invention relates to a liquid crystal display (LCD) device. More particularly, it relates to an array substrate for use in a liquid crystal display device and a method of manufacturing the same.

2. Description of Related Art

A liquid crystal display (LCD) device includes a display and a pad. The pad applies electrical signals to the display, and thus includes drive circuitry. The display produces an image. The display itself includes upper and lower substrates, and an interposed liquid crystal layer.

FIG. 1 is a schematic perspective view illustrating a typical liquid crystal display (LCD) device 10. The LCD device 10 includes an upper substrate 11 and a lower substrate 17, which are opposed to and spaced apart from each other. A liquid crystal layer 19 is interposed between the upper substrate 11 and the lower substrate 17. A color filter 13 and a common electrode 15 are located under the upper substrate 11. A matrix array of switching devices 21 and pixels 23 are arranged on the lower substrate 17, which is often referred to as an array substrate. The resolution of the LCD device is dependent on the number of pixels 23. The size and number of the pixels 23 determine the size of the LCD device.

Each pixel 23 is defined by crossing gate lines 25 and date lines 27. Each pixel 23 includes a pixel electrode 29 that is made of a transparent conductive material. Electrical fields are produced across the liquid crystal layer 19 by voltages applied across the pixel electrodes 29 and the common electrode 15 (on the upper substrate 11). A thin film transistor (TFT) 21 is formed near the crossing of each gate line 25 and data line 27. Each TFT acts as a switching device that selectively applies a voltage to an associated pixel electrode 29. Each TFT 21 includes a gate electrode, a source electrode, and a drain electrode (none of which are shown in FIG. 1). Each gate electrode electrically connects to a gate line 25, and each source electrode electrically connects to a data line 27.

As previously indicated the resolution of the LCD device 10 depends on the number of pixels 23 on the array substrate.

FIG. 2 is a plan view illustrating a typical liquid crystal display (LCD) device 40, including pad drive circuitry. The LCD device 40 includes displaying elements and drive circuitry that controls the displayed image. The drive circuitry includes gate drive circuitry 41 and data drive circuitry 43. Referring to FIGS. 1 and 2 as required, the gate drive circuitry 41 is arranged along one end of the gate lines 25. The gate drive circuitry 41 applies electrical signals to the gate electrodes (not shown) via the gate lines 25. The data drive circuitry 43 is arranged at one end of the data lines 27, and the data drive circuitry 43 applies electrical signals to the pixel electrodes 29 via the data lines 27 and the TFTs 21. While not shown, the pad drive circuitry also includes a power supply and various other peripheral circuits.

The LCD device described above is typically used for small display devices, such as watches or electronic calculators. However, there is a trend to use LCD devices for large displays, such as computer monitors. To obtain a large-sized LCD device using conventional methods, either small-sized substrates are mated together, or a large-sized substrate must be fabricated.

FIGS. 3A and 3B are plan views illustrating various array substrates used to fabricate conventional large-sized LCD devices. FIG. 3A shows array substrates 55, each having a display portion 51, a data pad portion 53, and a gate pad portion 57. Electrical signals are applied to the display portion via the pad portions 53 and 57. In general, the gate pad portion 57 is arranged along either the left side or the right side of the display portion 51, while the data pad portion 53 is arranged along either the top edge or the bottom edge of the display portion 51.

In the conventional method of fabricating a large-sized LCD device, the small-sized array substrates are mated to form a large-sized array substrate. The mated array substrates are then joined to a large upper substrate. After that, the electrical drive circuitry is connected to the pad portions of the array substrate.

However, mating small-sized array substrates together requires a relatively complex mating process. FIG. 3B is a plan view illustrating a conventional large LCD device 61. During the fabrication of that large LCD device 61, electrical defects, such as open- and short-circuits, can occur during assembly. Typical defects include dot defects and line defects. For example, a dot defect is when a particular TFT does not operate when electrical signals are applied via the drive circuitry. An example of a line defect is when all of the TFTs connected to a gate line (or to a data line) do not operate due to a shorted or open gate line (or data line). Other types of defects are possible. For example, a particle might causes a simple cell defect in a 15" display, but that same particle can cause a totally inoperative 30" display.

In a small LCD device, the economic loss caused by a defect is relatively low because small LCDs are relatively inexpensive to manufacture. However, with large-sized LCD devices, the economic loss that results from a defect can be much larger, at least partially because the manufacturing costs of large-sized LCD devices are so much higher. Furthermore, the larger areas involved and the more difficult fabrication process cause large-sized LCD devices to generally have low manufacturing yields.

SUMMARY OF THE INVENTION

Accordingly, the present invention is directed to a liquid crystal display device that substantially obviates one or more of the problems due to limitations and disadvantages of the related art.

An object of the invention is to provide a method of fabricating an array substrate that can be used for large LCD device and for small LCD devices.

In accordance with the purpose of the invention, as embodied and broadly described, in one aspect the principles of the present invention provide a method of manufacturing a liquid crystal display device, including: forming (M+m) gate and (N+n) data lines to define (M+m)×(N+n) pixels on a substrate, including (M×N) display pixels and (Mn+Nm+mn) redundant pixels; forming drive circuitry for operating each pixel; testing the (M×N) display pixels for electrical defects (such as open- or short-circuits); and disabling the redundant pixels (leaving them in a dark state) when the display pixels do not have any defects.

The redundant pixels can be disabled by removing the drive circuitry for the redundant pixels, or by not forming that drive circuitry. Other ways of disabling the redundant pixels include controlling the drive circuitry such that the redundant pixels are not activated, by cutting gate and/or data lines to the redundant pixels, or by covering the redundant pixels, such as with a black matrix.

Beneficially, to form sufficient redundant pixels, n and m are great than 10. However, to avoid excess redundant pixels n and m are beneficially less than 20.

In accordance with another aspect of the principles of the present invention, there is provided a method of manufacturing a liquid crystal display device, including: forming a pixel matrix on an array substrate; testing the array substrate for electrical defects (such as open- or short-circuits); cutting the array substrate into a plurality of smaller array substrates if a defect is found such that a plurality of pixels along the cuts become redundant pixels; mating a smaller array substrate with an upper substrate; injecting a liquid crystal into a space between the smaller array substrate and the upper substrate; and sealing the space using a sealant. Beneficially, the sealant overlaps the redundant pixels. Also beneficially, an insulation material is formed along the cut edges of the smaller substrate.

In accordance with the purpose of the invention, in another aspect the principles of the present invention provide a method of manufacturing a liquid crystal display device, including: forming a pixel matrix on a first substrate; testing the pixels for electrical defects (such as open- or short-circuits); disabling some of the pixels (leaving them in a dark state) when defects are not found; mating a second substrate with the first substrate; injecting a liquid crystal into a space between the first and second substrates; and sealing the space with a sealant.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF ILLUSTRATED EMBODIMENTS

Reference will now be made in detail to illustrated embodiments of the present invention, examples of which are shown in the accompanying drawings.

Figure 1:
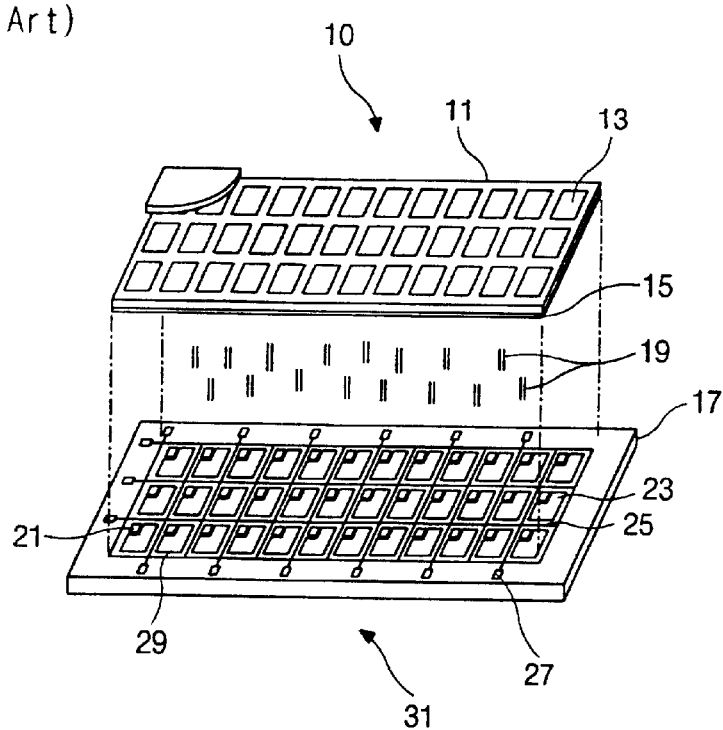
FIG. 1 is a schematic perspective view illustrating a typical liquid crystal display (LCD) device.
Figure 2:
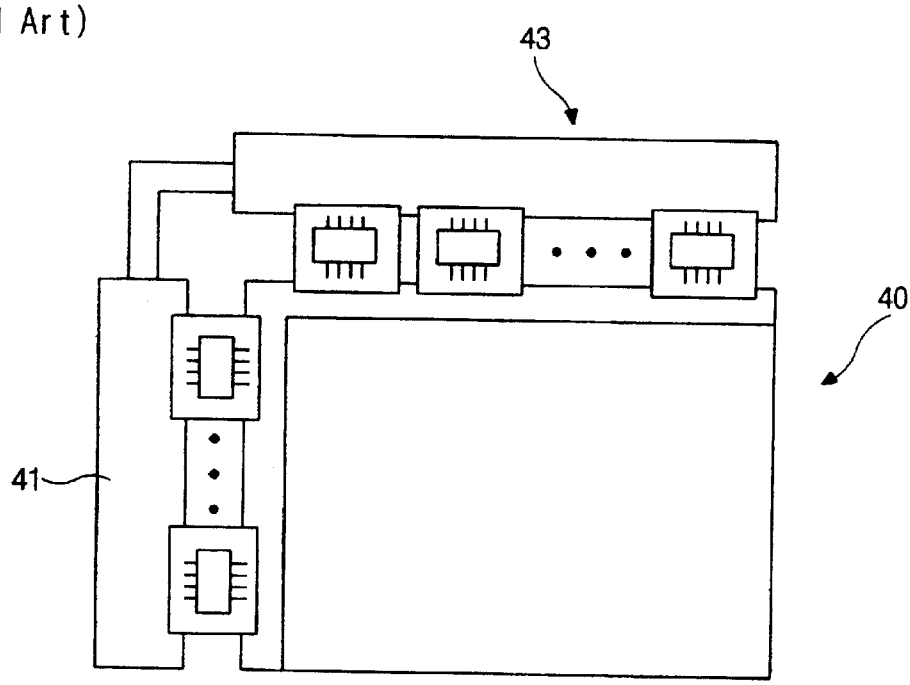
FIG. 2 is a schematic plan view illustrating a typical liquid crystal display (LCD) device that includes drive circuitry.
Figure 3A:
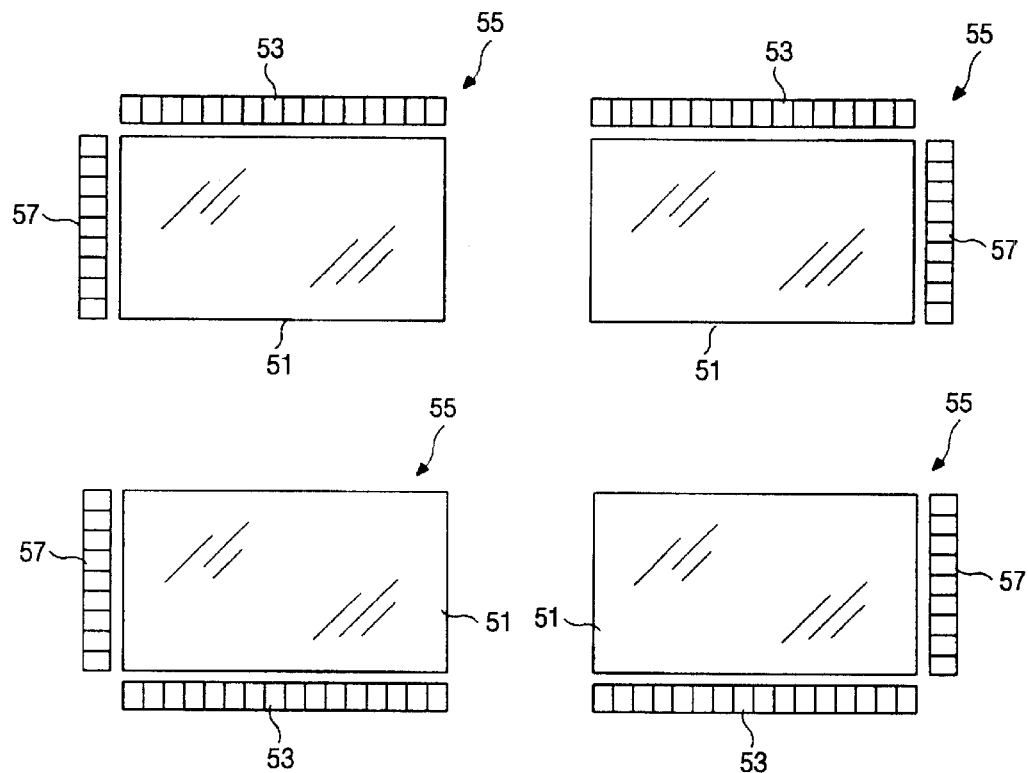
FIG. 3A shows a plurality of small-sized array substrates that are used to fabricate a conventional large-sized LCD device.
Figure 3B:
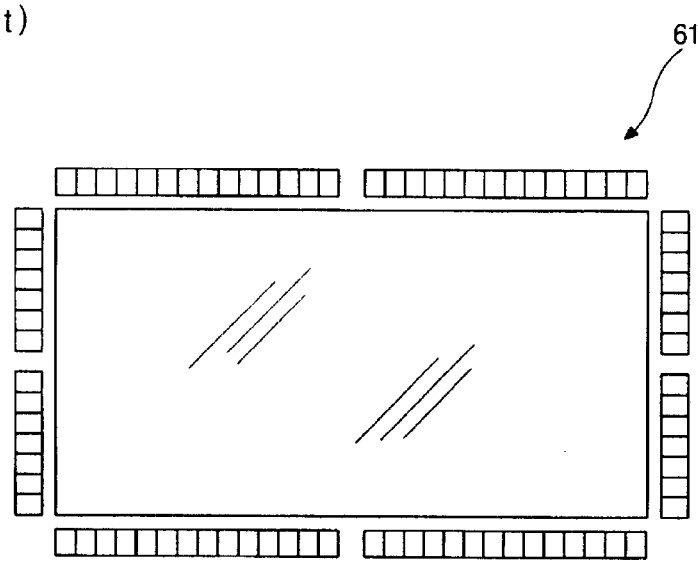
FIG. 3B is a plan view illustrating a conventional large LCD device.
Figure 4:
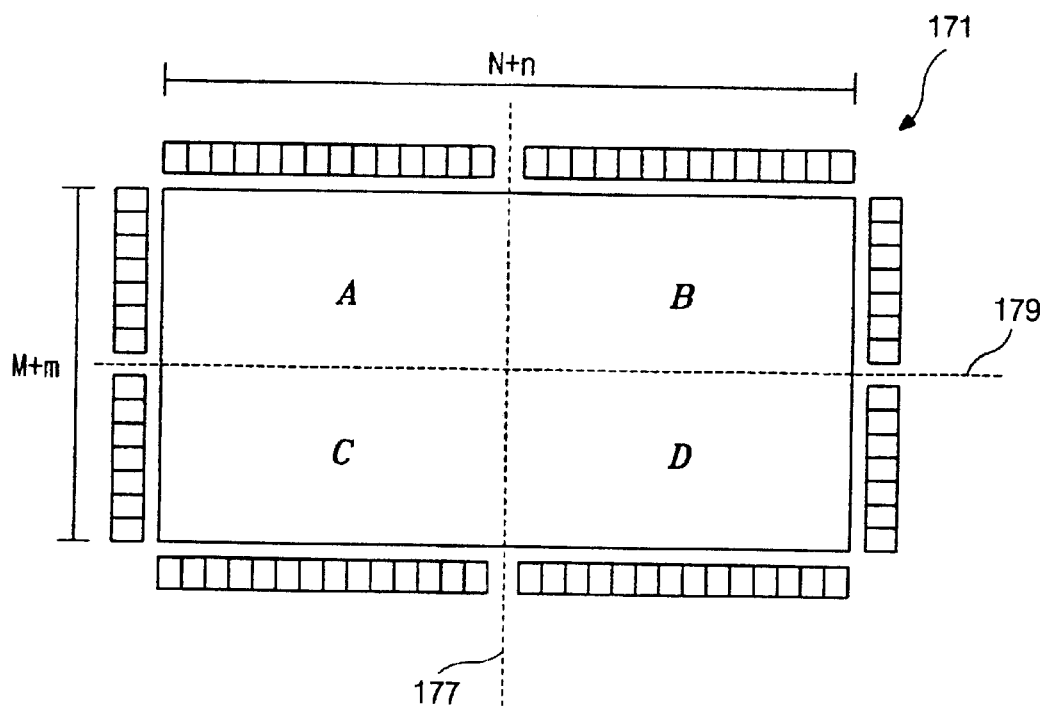
FIG. 4 is a plan view of an array substrate according to an embodiment of the present invention.

FIG. 4 is a plan view of an array substrate for a large-sized LCD device according to an embodiment of the present invention. Although the array substrate of FIG. 4 may look similar to the array substrate of FIG. 3B, those array substrates have different numbers of pixels. The array substrate of FIG. 4 includes (M+m)×(N+n) pixels that are fabricated to form an M×N display. This is contrary to the conventional method of forming an array substrate for an M×N LCD device in which only M×N pixels are fabricated. Namely, redundant pixels are added. Moreover, if the redundant pixels are not required, they are disabled such that they do not impact the LCD device. Beneficially, to provide sufficient redundant pixels, m and n are greater than 10. To avoid wasting space, the number of the redundant pixels are beneficially less than 20.

Referring now to FIG. 4, an array substrate 171 is formed using a large glass substrate. Although not depicted, gate and data lines are formed and electrically tested (such as for open- and short-circuits). Assuming that the array substrate 171 is defect free, the large array substrate 171 can be used for a large LCD device. However, if a defect is found, the array substrate 171 is divided into areas A, B, C, and D by cutting along the dotted lines 179 and 177. This allows the cut portions to be used for small-sized LCD devices. Thus, the array substrate 171 can be used in two way. First, with no defects the large array substrate 171 is useful for large LCD devices. With a defect the cut portions are useful for small-sized LCD devices.

Figure 5:
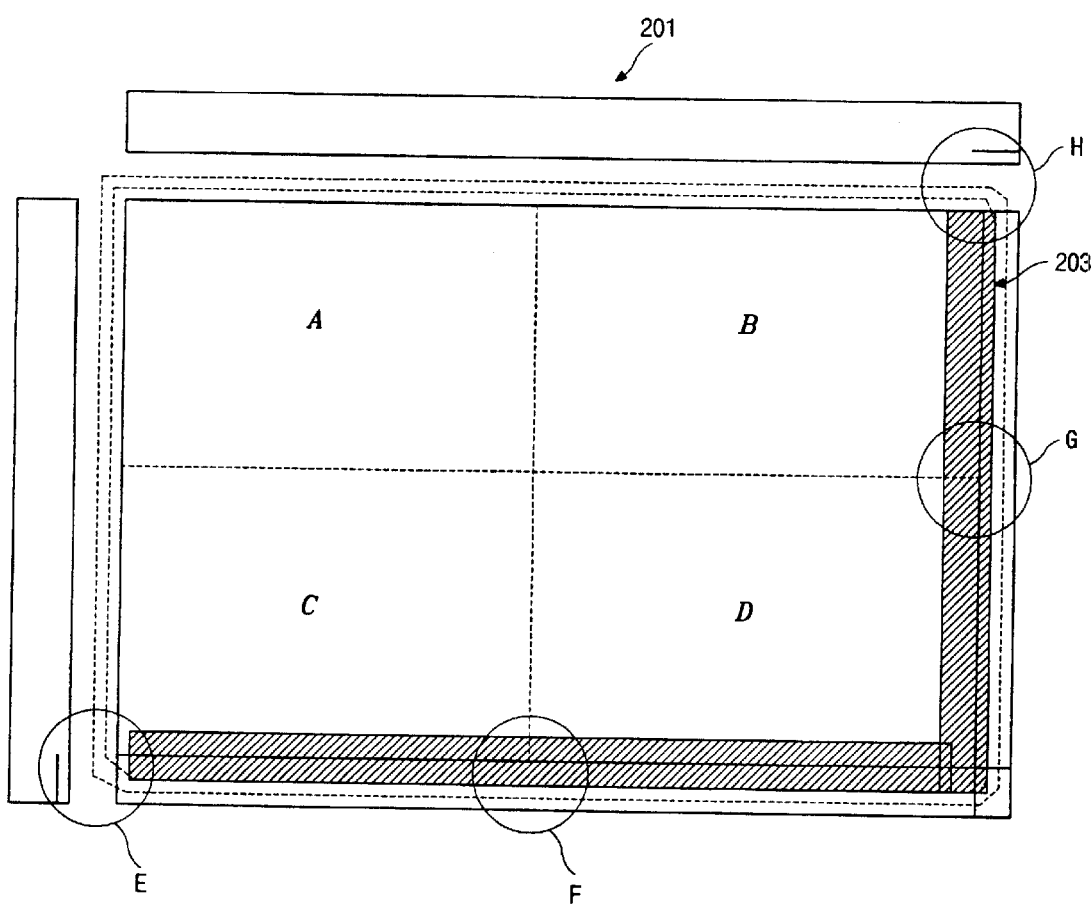
FIG. 5 is a plan view of a large-sized LCD device using the array substrate of FIG. 4.

FIG. 5 is a plan view of a large array substrate of a large-sized LCD device according to the principles of the present invention. If the array substrate is defect free, a large LCD device 201 having redundant pixels is fabricated. This is performed by disabling an area 203 (defined by oblique lines) comprised of excess, and therefore redundant, pixels. That means that the redundant pixels in the area 203 are either not operated, or an opaque mask, such as a black matrix, covers the area 203. Thus, the redundant pixels in the area 203 do not affect the displayed image.

One method of disabling the redundant pixels in the area 203 is to cut the gate and data lines. Such cutting is explained with the assistance of portions E, F, G and H in FIG. 5.

Figure 6:
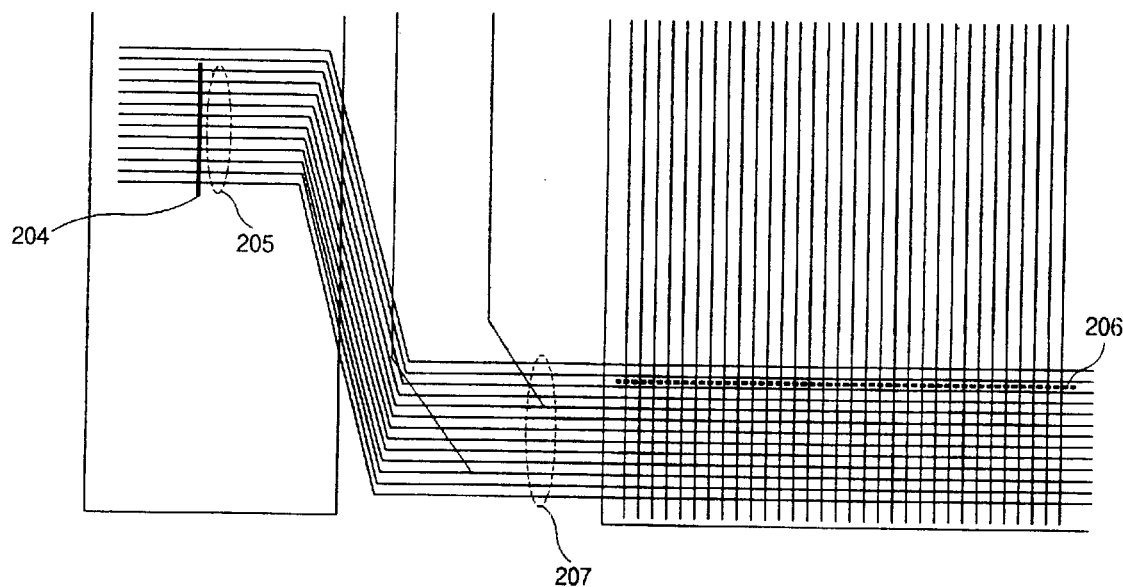
FIG. 6 is a schematic enlarged plan view of a portion "E" of FIG. 5.

One way to disable the lower portion of the area 203 is shown in FIG. 6, which is an enlarged view of portion "E" of FIG. 5. As shown in FIG. 6, the gate lines 207 are arranged in a transverse direction (see FIG. 5). Those gate lines electrically connect to gate pads 205. Still referring to FIG. 6, to disable the lower portion of the area 203, the gate pads 205 for the gate lines in the lower portion are cut along a line 204, beneficially using a laser. Therefore, electrical signals are not applied to the gate lines 207 in the lower portion of the area 203, and thus the pixels connected to those gate lines 207 are disabled.

Figure 7:
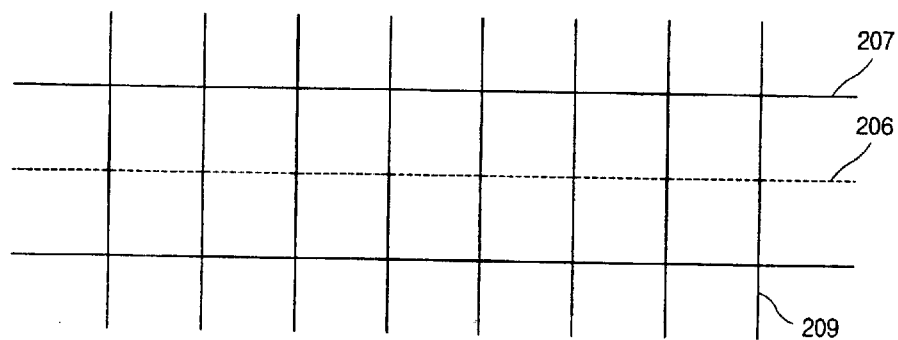
FIG. 7 is a schematic enlarged plan view of a portion "F" of FIG. 5.

Another way to disable the lower portion of the area 203 is shown in FIG. 7, which is an enlarged view of portion "F" of FIG. 5. As shown, the gate lines 207 are arranged in a transverse direction, while a plurality of data lines 209 are arranged perpendicular to the gate lines 207. To disable the pixels in the lower portion of the area 203, all of the data lines 209 are cut along a dotted line 206 that is just above the lower portion of the area 203. Therefore, although scanning signals are applied to the gate lines 207, the pixels in the lower portion of area 203 (see FIG. 5) are disabled.

One way to disable the pixels in the right portion of the area 203 is to cut the data lines 209 in the region H (see FIG. 5) just above the top-most pixel. Therefore, although scanning signals are applied to the gate lines 207 in the right portion of the area 203, the pixels in the right portion are disabled.

Figure 8:
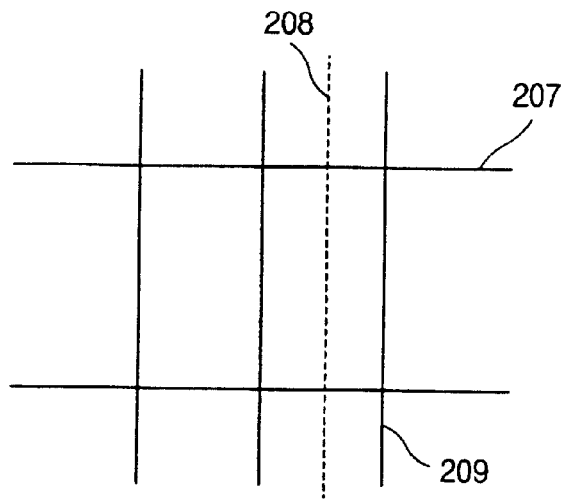
FIG. 8 is a schematic enlarged plan view of a portion "G" of FIG. 5.

Another way to disable the pixels in the right portion of the area 203 is to cut all of the gate lines 207 just to the left of the right portion. Therefore, although scanning signals are applied to the gate lines 207, those signals cannot pass to the pixels in the right portion of the area 203, and thus the pixels in the right portion are disabled. This is shown in FIG. 8, which is an enlarged plan view of portion "G" of FIG. 5. As shown in FIG. 8, the gate lines 207 are cut along a line 208. Thus, although the data signals are applied to the data lines 209, the redundant pixels arranged on the right side of the cutting line 208, i.e., in the area 203 (see FIG. 5), are not operable because the scanning signals are not applied to the gate lines 207 of the redundant pixels that is arranged in the area 203 (see FIG. 5).

Another way to disable the redundant pixels in the area 203 (see FIG. 5) is to remove, or simply not form, the drive circuitry for the redundant pixels. An electronic way to disable the redundant pixels is to electrically by-pass the redundant pixels. This can be accomplished by not applying gate drive signals to the gate lines for the redundant pixels, and by not applying signals on the data lines for redundant pixels. Another way to disable the redundant pixels in the area 203 is to mask the area 203 with an opaque mask. For example, a black matrix material can be formed over the area 203.

Figure 9:
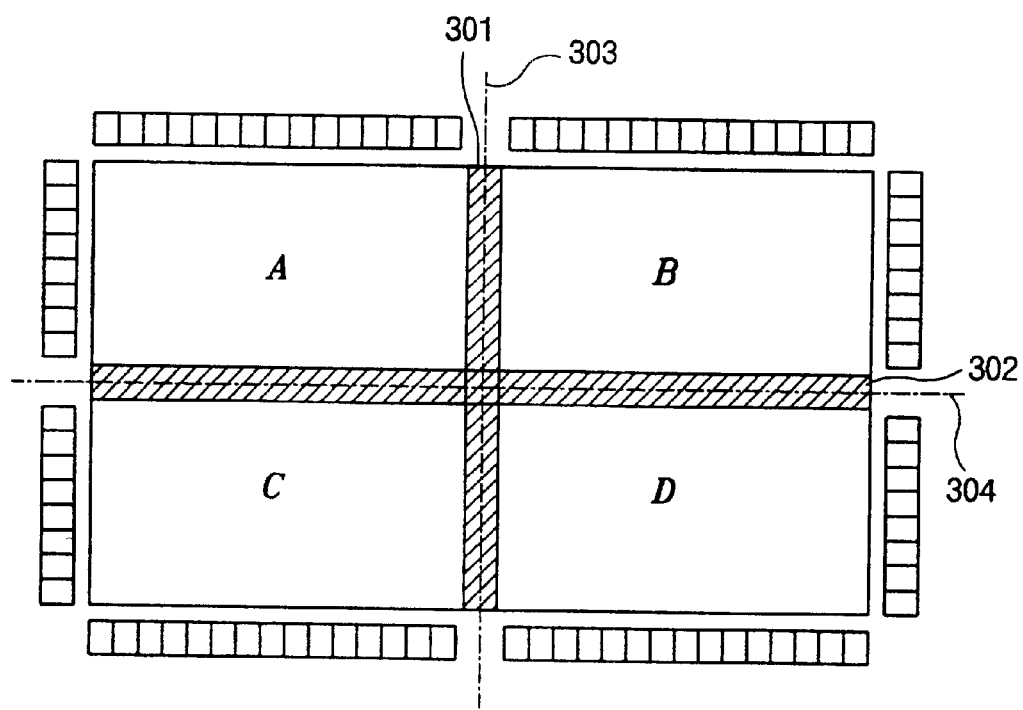
FIG. 9, a plan view of the array substrate of FIG. 4 with illustrated cutting lines for producing small-sized LCD devices.

However, if the large array substrate of FIG. 5 has defects, that large array substrate is divided into small array substrates for use in small-sized LCD devices. FIG. 9 is a plan view illustrating the division of the large array substrate into small array substrates. The large array substrate is cut along the central lines 304 and 303. After the cut, as shown in FIG. 9, a plurality of the pixels in an area 302 along the line 304 are redundant pixels, and a plurality of the pixels in an area 301 along the line 303 are redundant pixels.

Figure 10:
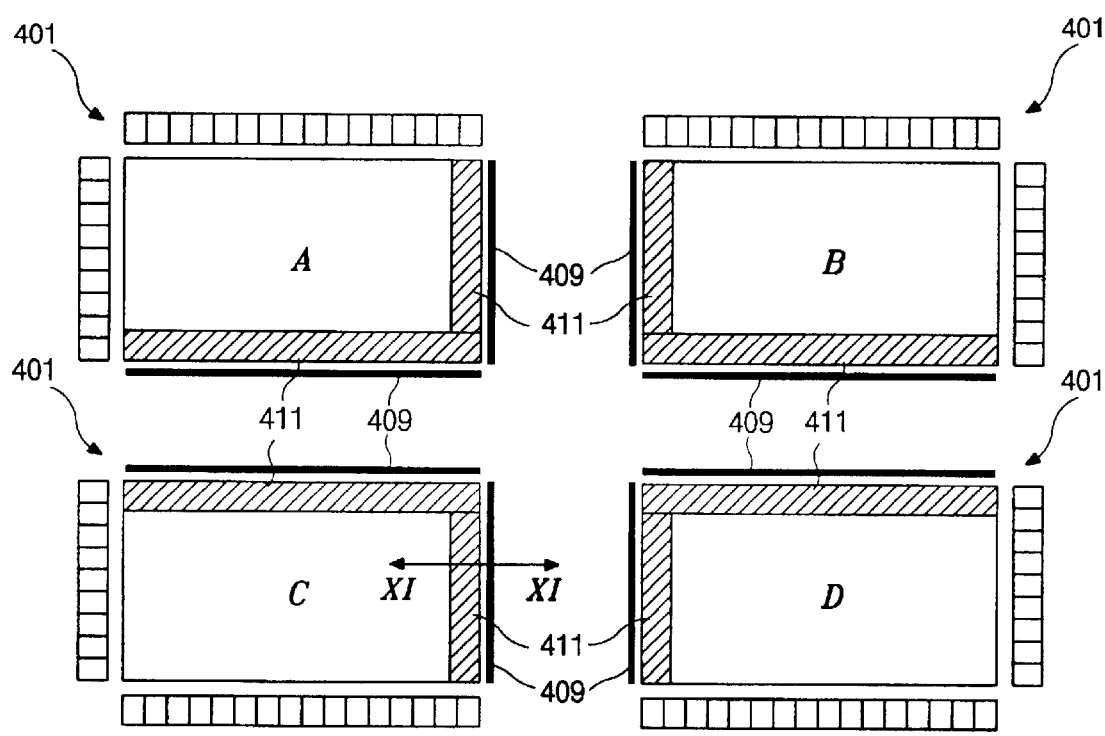
FIG. 10 is plan views of LCD devices fabricated after cutting the array substrate of FIG. 9 along the illustrated cutting lines.

FIG. 10 is plan view of small LCD devices fabricated from the large array substrate of FIG. 5 after being cut according to FIG. 9. As shown in FIG. 10, the large array substrate is used to fabricate small LCD devices "A", "B", "C", and "D". The redundant pixel areas 411 of the small LCD devices are beneficially disabled (as provided for above).

Figure 11:
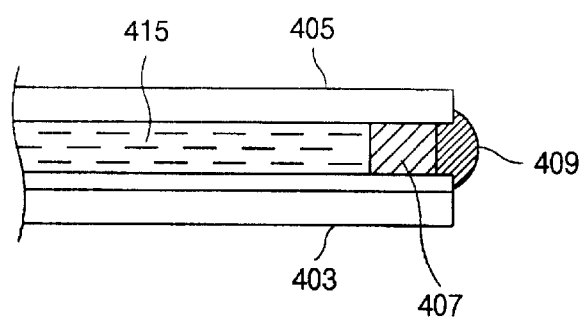
FIG. 11 is a partial cross-sectional view taken along line XI—XI of FIG. 10.

FIG. 11 is a partial cross-sectional view taken along line XI—XI of FIG. 10. As shown, a small LCD device includes an array substrate 403 that is joined to an upper substrate 405 using a sealant 407. That sealant is beneficially arranged in the redundant pixel area 411 (see FIG. 10) of the array substrate 403. An insulation material 409 then insulates the edges of the array substrate to protect the gate and data lines that were exposed by the cutting and division. A liquid crystal 415 is interposed between the array substrate 403 and the upper substrate 405. Data drive integrated circuitry (not shown) connects to data pads, and gate drive integrated circuitry (not shown) connects to the gate pads.

Accordingly, the principles of the present invention have the following advantages. First, a large array substrate can be used for either a large-sized LCD device or for small-sized LCD devices. Such is enabled by redundant pixels.

Second, overall manufacturing yields are improved and manufacturing costs are reduced since a defective large size array substrate can be used for small-sized LCD devices.

Third, by using a defective large array substrate for small LCD devices, a competitive advantage is achieved when attempting to fabricate large-sized LCD devices.

Fourth, the principles of the present invention compensate for defective large array substrates.

While the principles of the invention have been particularly shown and described with reference to illustrated embodiments thereof, it will be understood by those skilled in the art that the foregoing and other changes in form and details may be made therein without departing from the spirit and scope of the invention.

What is claimed is:

1. A method of manufacturing a liquid crystal display device, comprising;

forming an array substrate having (M+m) gate lines and (N+n) data lines to define a matrix of (M+m)×(N+n) pixels, wherein the (M+m)×(N+n) pixels include (M×N) display pixels and (Mn+Nm+mn) redundant pixels;

testing the display pixels for electrical defects; and disabling the redundant pixels if the display pixels are defect free.

2. A method of manufacturing a liquid crystal display device according to claim 1, wherein the redundant pixels are disabled by removing drive circuitry.

3. A method of manufacturing a liquid crystal display device according to claim 1, wherein the redundant pixels are disabled by controlling the drive circuitry for the redundant pixels.

4. A method of manufacturing a liquid crystal display device according to claim 1, wherein a plurality of redundant pixels are disabled by cutting gate lines.

5. A method of manufacturing a liquid crystal display device according to claim 4, wherein a plurality of redundant pixels are disabled by cutting data lines.

6. A method of manufacturing a liquid crystal display device according to claim 1, wherein a plurality of redundant pixels are disabled by cutting data lines.

7. A method of manufacturing a liquid crystal display device according to claim 1, wherein the redundant pixels are disabled by a mask.

8. A method of manufacturing a liquid crystal display device according to claim 7, wherein the mask is a black matrix.

9. A method of manufacturing a liquid crystal display device according to claim 7, wherein the mask is a sealant.

10. A method of manufacturing a liquid crystal display device according to claim 1, wherein n is greater than 9.

11. A method of manufacturing a liquid crystal display device according to claim 1, wherein n is less than 20.

12. A method of manufacturing a liquid crystal display device according to claim 1, wherein the electrical defect is a short-circuit.

13. A method of manufacturing a liquid crystal display device according to claim 1, wherein the electrical defect is an open-circuit.

14. A method of manufacturing a liquid crystal display device according to claim 1, further including the steps of:

cutting the array substrate into a plurality of cut substrates if a defect is found; and attaching an upper substrate to a cut substrate, wherein the cut substrate is comprised of the defective free pixels, using a sealant.

15. A method of manufacturing a liquid crystal display device according to claim 14, wherein said sealant masks a plurality of pixels.

16. A method of manufacturing a liquid crystal display device according to claim 15, wherein insulation is placed over cut data lines and cut gate lines.

17. A method of manufacturing a liquid crystal display device according to claim 14, wherein a liquid crystal is disposed between said cut substrate and said upper substrate.

18. A method of manufacturing a liquid crystal display device, comprising;

forming a plurality of pixels in a matrix on a first substrate;

testing the formed pixels for defects;

cutting the first substrate into a plurality of small substrates when a defect is found;

providing a plurality of second substrates that correspond in size to the cut small substrates, wherein the cut small substrates are comprised of defect free pixels;

assembling a second substrates to each small substrate, respectively;

injecting liquid crystal into a space between the small substrates and the second substrates; and sealing the space using a sealant.

19. A method of manufacturing a liquid crystal display device of claim 18, wherein the sealant overlaps pixels.

20. A method of manufacturing a liquid crystal display device of claim 18, further including forming an insulation along edges of the cut small substrates.

21. A method of manufacturing a liquid crystal display device, comprising;

forming a plurality of pixels in a matrix on a first substrate;

testing the pixels for defects;

disabling some of the pixels when a defect is not found;

assembling a second substrate with the first substrate;

injecting a liquid crystal into a space between the first and second substrates; and sealing the space with a sealant.

* * * * *